United States Patent

[11] 3,584,942

[72] Inventor Rogers B. Downey
Lexington, Mass.
[21] Appl. No. 783,242
[22] Filed Dec. 12, 1968
[45] Patented June 15, 1971
[73] Assignee Polaroid Corporation
Cambridge, Mass.

[54] MOVING-PICTURE CASSETTE
10 Claims, 18 Drawing Figs.
[52] U.S. Cl. .................................................. 352/78, 352/130
[51] Int. Cl. ..................................................... G03b 23/06
[50] Field of Search .......................................... 352/72–78, 130; 95/90.5; 242/197, 199, 200; 350/96, 96 B

[56] References Cited
UNITED STATES PATENTS
| | | | |
|---|---|---|---|
| 2,275,497 | 3/1942 | Berndt | 242/200 |
| 2,560,564 | 7/1951 | Foster et al. | 352/78 X |
| 2,825,260 | 3/1958 | O'Brien | 350/96 (B) |
| 2,931,857 | 4/1960 | Hammond, Jr. et al. | 352/130 X |
| 3,208,686 | 9/1965 | Edwards et al. | 352/78 X |
| 3,281,199 | 10/1966 | Kingston | 352/78 X |
| 3,383,998 | 5/1968 | Takats | 95/90.5 |
| 3,410,498 | 11/1968 | Winkler et al. | 352/78 X |
| 3,475,089 | 10/1969 | Funck | 352/78 X |
| 3,479,112 | 11/1969 | Lester | 352/78 X |
| 3,480,226 | 11/1969 | Roman | 352/78 X |

Primary Examiner—Louis R. Prince
Assistant Examiner—Joseph W. Roskos
Attorneys—Brown and Mikulka, William D. Roberson and Robert L. Berger ABSTRACT: A motion picture film handling cassette useful in film exposure, processing, and projection operations. An unexposed strip of photographic material is initially coiled within an opaque housing and adapted to be reversibly advanced therewithin along a guide path, defined in part by a roller mounted for free rotation and a pair of spaced apart film-contacting segments extending in registry from opposed sidewalls of the cassette, and across a film gate and a normally inoperative processing station. The film strip includes a narrow portion which, when aligned with the film-contacting segments, effects disengagement of the film strip therefrom, and an arrangement is included for selectively restraining rotation of the roller during film advance responsive to operation of an externally mounted member.

PATENTED JUN 15 1971 3,584,942

INVENTOR.
ROGERS B. DOWNEY

BY

Brown and Mikulka
ATTORNEYS

PATENTED JUN 15 1971

*INVENTOR.*
ROGERS B. DOWNEY

BY

*Brown and Mikulka*
ATTORNEYS

INVENTOR.
ROGERS B. DOWNEY

BY

Brown and Mikulka
ATTORNEYS

INVENTOR.
ROGERS B. DOWNEY

BY

Brown and Mikulka
ATTORNEYS

INVENTOR.
ROGERS B. DOWNEY
BY
Brown and Mikulka
ATTORNEYS

MOVING-PICTURE CASSETTE

A camera adapted to use the aforesaid motion-picture film and cassette may, for instance, be of a type also capable of accepting a standard motion-picture film such, for example, as one having the physical characteristics of so-called "Single-8" or "Super-8" film. The camera may, therefore, include features of a substantially conventional category and embody means cooperating with the cassette of the invention for mounting the same, for intermittently advancing the film, and for driving rotatable components of the cassette, while at the same time being optically suited to utilize the special film contained therein. On the other hand, the camera may possess unique characteristics especially adapted to the type of motion-picture film carried by the cassette in effecting its exposure and processing.

A viewing device adapted to employ the subject cassette is contemplated in the form of a compact cabinet-type unit incorporating a viewing screen comparable in area to that of a television receiver. Such a unit is primarily intended for home entertainment purposes but, alternatively, its use may be extended to scientific or other fields where an immediate showing is of advantage following the taking of a motion-picture.

Although a certain degree of recognition has previously been given to the possibility of rapidly processing and viewing an exposed motion-picture film, no practical system is known to have evolved therefrom. At least no such system is believed to have as yet been made available in a form adapted to public usage. Included in the art relating to the subject may be listed U.S. Pat. Nos. 2,930,302, 2,971,445 and 3,237,541. In general, a complexity of apparatus appears to pervade the art which complexity is unsuited to cost, appearance and operational-simplicity limitations considered of importance herein.

The current trend in nonprofessional or so-called "home-movie" picture-taking is to employ a cassette holding a supply of motion-picture film which can easily and quickly be mounted in a camera and which, when thus mounted, provides, automatically, that the film is correctly threaded and ready for "shooting". After exposure of a complete length of film, the cassette, customarily, is removed from the camera and forwarded to a remote processing station, as by postal means, for accomplishing its processing. The processed film is then returned on a spool or in a second cassette ready for projection. The projector usually includes means for readily mounting and removing the spool or second cassette and for automatically threading the film.

The cassette of the present invention includes the operational advantages, above described with respect to rapid mounting of motion-picture film in a camera or projector, as well as its equaly rapid removal therefrom. However, additionally, it makes possible a combination of the advantages in a single unit adapted to mounting in both the camera and the projector for performing both the taking and viewing operations. And, because of its function with respect to film processing, the cassette eliminates the delay, usually measured in days, which is conventionally required to process a motion-picture film after its exposure. A system including the cassette of the present invention permits the viewing of a completely processed motion-picture film within a matter of minutes after taking it. It also makes possible the viewing of extensive film footage immediately upon returning from a protracted period of picture-taking.

In view of the foregoing considerations, a principal object of the present invention is to provide a compact motion-picture film cassette or magazine of the character described wherein given means positioned or positionable within a special chamber thereof traversed by the film perform essential functions relative to film exposure, processing and projection. Other objects are to provide a cassette of the type stated in which the aforesaid means include, respectively, special forms of pressure plates enabling positioning of and access to the film; means for applying a processing substance to the film emulsion, means for bringing the film into contract with a processing substance, and means for displacing a film portion for subjection to a processing treatment; to provide a cassette in which is mounted reflecting means for directing light from an external source to the film for projection purposes; to provide a cassette wherein a light source is directly positionable therein; and to provide a cassette into which film-illuminating rays are introduced by fiber-optics means. Additional objects are to provide a cassette as characterized embodying complementary film snubbing and guiding means and means complementary to driving mechanism of a unit in which the cassette is mounted such as a camera or projector render possible a rapid film rewind and the accommodation of maximum film footage within the cassette.

Other objects of the invention will in part be obvious and will in part appear hereinafter.

The invention accordingly comprises the product possessing the features, properties and the relation of components and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
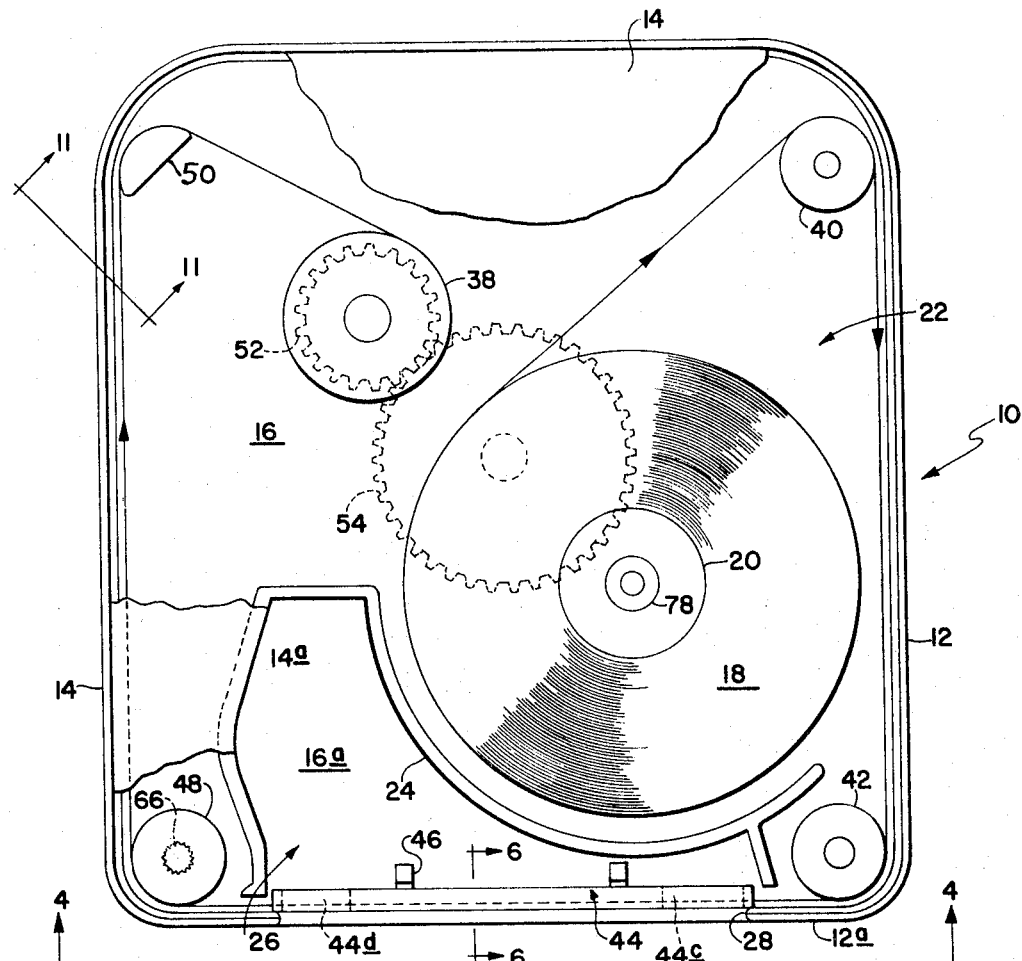
FIG. 1 represents a diagrammatic side view of a film-containing portion of a single-section cassette or, if a two-section cassette, taken in the first direction 1-1 of FIG. 4.

Referring now to the drawings, in FIG. 1 a cassette 10 of the subject invention is shown from the aspect of its film-manipulating portions. The cassette housing includes an endwall 12, a first light-shielding sidewall 14 mounted across one face thereof exclusive of an excised or cutaway portion 14a, and a recessed web or second sidewall 16, parallel to wall 14, for both mounting the film-controlling components and providing an additional light-shield relative to the film 18. The film, which may be assumed to be loaded in the cassette in an unexposed state when the cassette is purchased, is coiled on a supply spool 20 mounted for rotation in a chamber 22 formed by the area lying between the sidewalls 14 and 16, the endwall 12 and an internal contoured wall or partition 24. The partition 24 extends transversely between the sidewalls 14 and 16 and is of a length and conformation such as to form a cavity or second partially open chamber 26 extending inwardly of the aperture provided by the excised wall portion 14a. Partition 24 thus serves as a wall common to and separating the chamber 22 and 26. An opening 28, leading into chamber 26 and constituting a multipurpose aperture relative to such operations as the exposure, processing and projection of the film, is formed in the endwall portion 12a and connects directly with the open excised portion of sidewall 14, thus substantially forming with the latter a continuous opening. The internal partition 24, in addition to its role in forming the separate chambers 22 and 26 provides a light and dust shield or barrier relative to film materials contained within the chamber 22.

Figure 2:
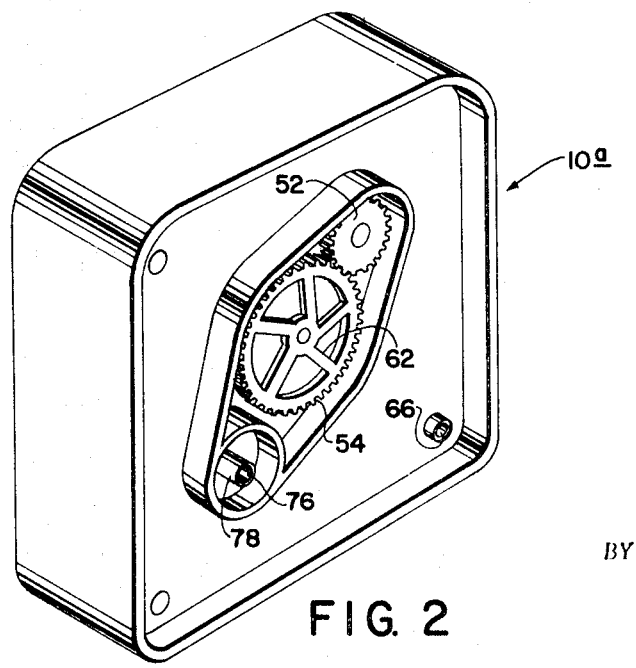
FIG. 2 is a diagrammatic perspective view of the cassette, taken from a side opposite that of FIG. 1.
Figure 4:
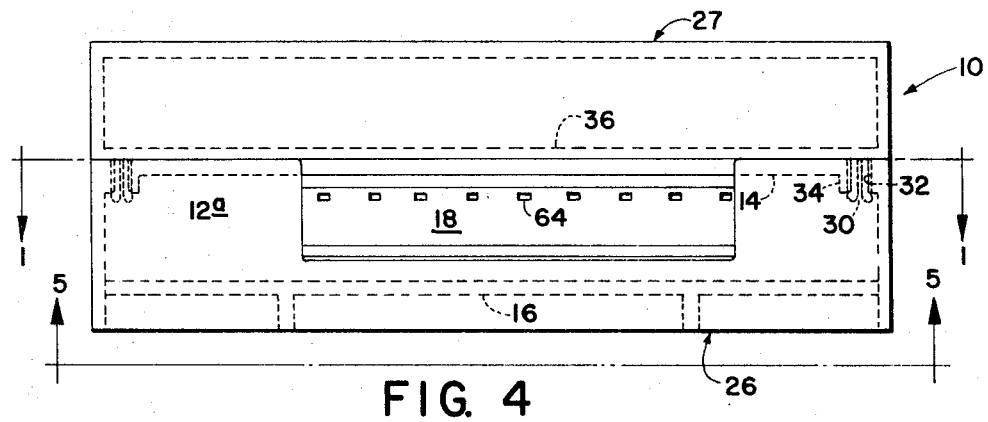
FIG. 4 is a diagrammatic end view of a two-section cassette, taken in a first direction 4-4 of FIG. 1.
Figures 3, 13:
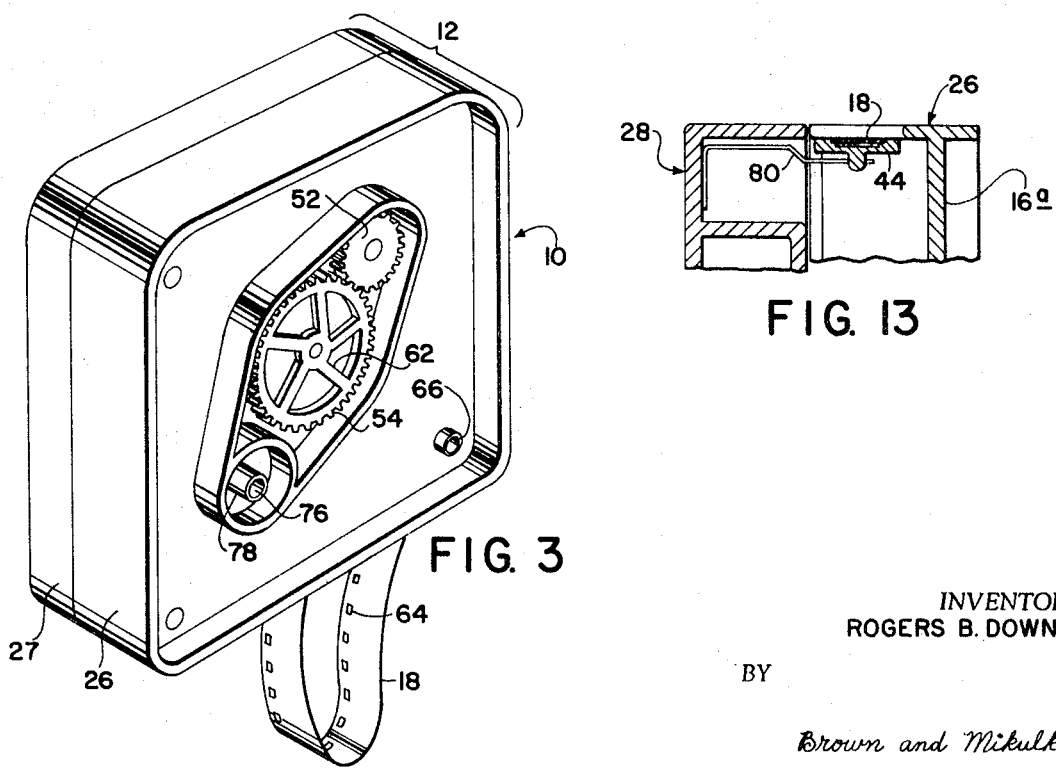
FIG. 3 is a view similar to that of FIG. 2 illustrating a modification of the cassette housing structure to one of two sections.
FIG. 13 is a diagrammatic side view of a modification of the pressure plate of FIGS. 1 and 6.

The cassette may be in the form of a single unit or section 10a, as shown in FIG. 2, or it may comprise two sections 26 and 27, as represented in FIGS. 3 and 4, the sections being held together in firm but manually releasable engagement by a plurality of compressible, e.g., slotted, studs 30 projecting from one of the sections and inserted in mating apertures of the other section. As illustrated, the studs 30 project from the section 27 and are positioned within the apertures 32 formed in the block portions 34 of the section 26 but a reverse arrangement of the components is, of course, possible. It is to be noted that when the two cassette sections are fastened together, as shown in FIG. 4, the cutaway portion 14a forming an opening into chamber 26 is contiguous with, and hence covered by a principal wall 36 of the section 27.

Assuming the two-section structure of the cassette, above-described, the section 27 may, appropriately, serve as a container for a film-developing substance, such as a viscous fluid or liquid, or for other means associated with an ultra rapid processing operation following exposure of the film. In one instance, and as further described below, the section 27 would be separated and repositioned, for example in a projector, for introducing the exposed film thereinto; in an alternative procedure, the two sections would remain in assembled relation. In the single housing structure of FIG. 2, it is to be assumed that a sidewall equivalent to wall 14 would be positioned across one face of the housing, namely, across the rear face in FIG. 2 which is not visible. The open chamber 26 would be protected, prior to use of the cassette, by a removable strip of paper or the like or by a packaging material.

Figure 6:
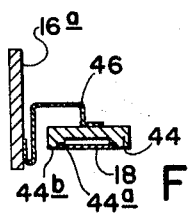
FIG. 6 is a diagrammatic side view of the pressure plate, taken in a second direction 6-6 of FIG. 1.

The cassette, as commercially supplied, contains a given length, e.g., 50 feet of the film 18, in a photosensitive condition and having appropriate lengths of leader and trailing portions, attached to a takeup spool 38 and the supply spool 20, respectively, in conformance with operational requirements. From the supply spool 20 the film passes around the freely rotatable guide rolls 40 and 42, across the aperture 28 having a pressure plate 44, biased by the flat springs 46, positioned thereacross to provide a correct location of the film for exposure or other purpose, around the fixedly held snubbing roll 48 and the supplemental stationary snubbing element 50, and is finally taken up on the takeup spool 38. In FIGS. 1 and 6, the pressure plate 44 is shown as being resiliently attached to the wall 16a by the flat springs 46.

Figure 5:
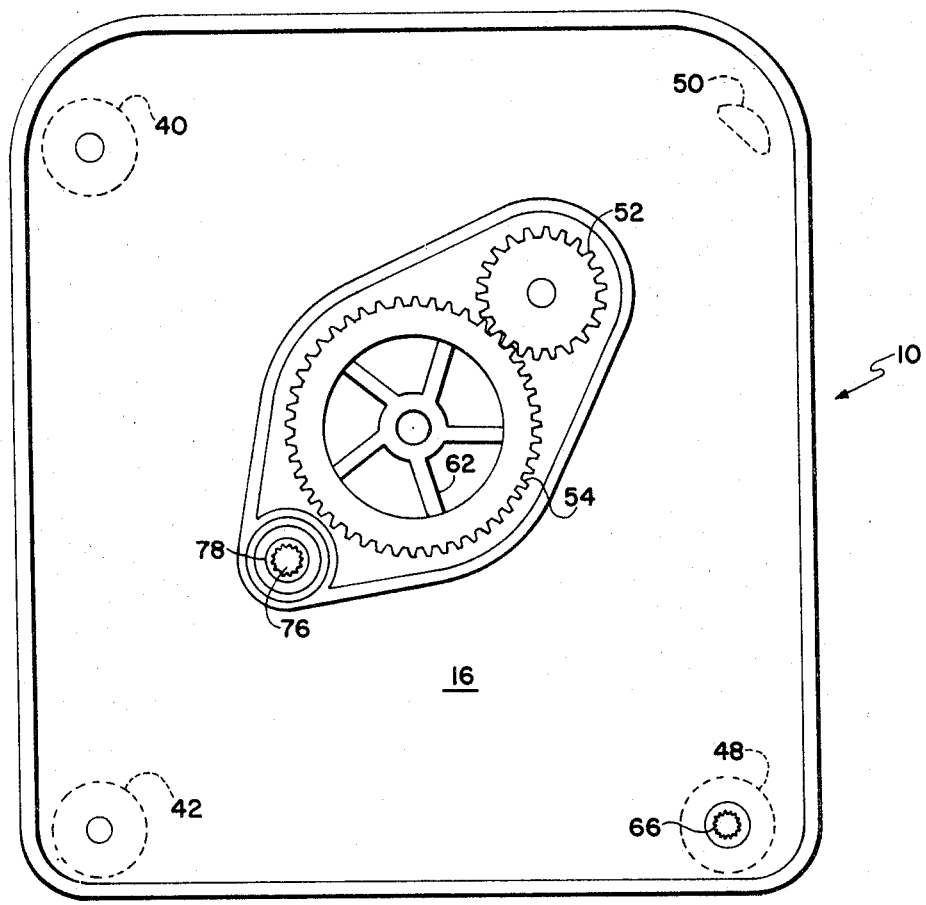
FIG. 5 is a diagrammatic side view of the cassette taken in a second direction 5-5 of FIG. 4.
Figure 7:
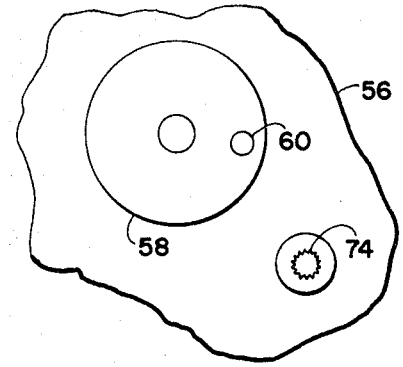
FIG. 7 is a diagrammatic fragmentary view of complementary driving means for the mechanism of FIGS. 2, 3 and 5.

As illustrated more particularly in FIGS. 2, 3 and 5, the takeup spool includes an integral coaxial gear 52 fixedly attached to its shaft and located at the opposite side of the wall 16. A larger drive gear 54 meshes with gear 52, driving the latter at an augmented speed. The gear 54, in turn, is adapted to be rotated by driving means of the unit in which the cassette is mounted, e.g., a camera or projector. Such a unit is represented in FIG. 7 by the fragmentary wall portion 56, the rotatable driving disc 58, and the integral pin 60 projecting therefrom. The pin 60 is adapted to engage a radial surface of one of the spokes 62 of the gear 54 when the cassette is mounted in the aforesaid unit to provide rotation of the takeup spool 38. It may be assumed that the driving means of the camera or projector includes a friction-clutch mechanism permitting an intermittent holding of the takeup spool 38 against rotation under the influence of the intermittent element. The film is wound on the supply spool and taken up on the takeup spool with the film emulsion innermost, as necessitated by the film structure and its positioning for correct exposure. A film structure relating to that employed in the cassette of the present invention is shown in U.S. Pat. No. 3,087,815. Where, for some reason such as protection of the film emulsion, it is desired to reverse the position of the film emulsion from that above-stated, it is to be understood that means providing a reversal thereof are to be considered broadly, as within the scope of the invention.

Figure 10:
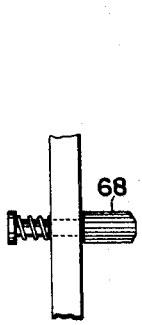
FIG. 10 is a diagrammatic side view of a component for providing the snubbing characteristic of the element of FIG. 9.

Assuming the cassette 10 to be mounted in a camera or projector unit and the film 18 to be undergoing advancement from the supply spool 20 to the takeup spool 38, it will be understood that the film is moved by intermittent means of the aforesaid unit, e.g., by a claw 63 (FIG. 8) engaging the film sprocket holes 64, in cooperation with the takeup means 38, driven through the medium of the friction clutch, and the snubbing roll 48. The snubbing roll, composed, for example, of a molded rubber and preferably having a slightly concave surface as shown in FIG. 9a so as to bear predominantly against the film margins, is mounted for rotation, together with other rotatable elements, in bearing means provided in wall 16. However it is held fixed during the aforementioned film advancement to perform its snubbing function by the introduction into a longitudinally slotted concavity 66 thereof (FIGS. 5 and 9a) of a fluted self-centering pin component 68 (FIG. 10), actuated to assume a functional or nonfunctional position by mechanism of the camera or projector, not shown, When the pin 68 is removed from the recess 66, the roll 48 is free to rotate as, for example, during a rewind operation, namely, during passage of the film from spool 38 to spool 20.

Assuming pin 68 to have been inserted in recess 66, action of the snubbing element 48 at two stages of operation is illustrated in FIGS. 1 and 9b. In FIG. 1 the film may be considered as held stationary by a firm frictional contact with the snubbing element 48, having been tautened thereagainst by the takeup spool 38. In FIG. 9b it may be assumed that the claw of the intermittent mechanism has advanced the film across aperture 28 to an extent such as to release the film from a binding contact with the roll 48. It is thus free to undergo a stepwise advancement when drawn upon by the takeup spool 38.

Figure 11:
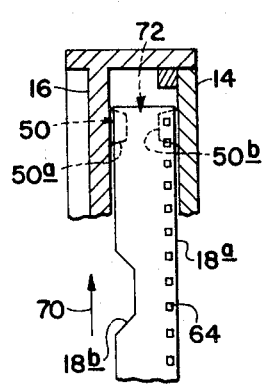
FIGS. 11 and 12 are diagrammatic views of a modified snubbing element, taken in a third direction 11-11 of FIG. 1.
Figure 12:
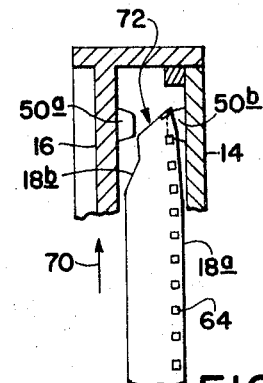

The snubbing element 50, operating also in conjunction with the intermittent and takeup spool which provide a loosening and tautening of the film, serves a supplemental or auxiliary snubbing function in cooperation with the snubbing roll 48 during advancement of the film. Alternatively it may constitute an independent snubbing element, in which latter instance roll 48 may be considered as merely a freely rotating guide roll. Operation of the snubbing element 50 is shown graphically in FIGS. 11 and 12 which may be considered as taken along the line 11—11 of FIG. 1. In FIG. 11, a trailing portion 18a of the film having an excised area 18b is illustrated moving in the direction of the snubbing element 50 as indicated by arrow 70. This snubbing element comprises two transversely opposite curved segments 50a and 50b, one of which is integral with wall 14 and other with wall 16, a space or slot 72 of a width substantially less than that of the film being provided therebetween. When the excised film area 18b reaches the snubbing components 50a and 50b, the narrowed film, under tension, is caused to assume an angled conformation, as shown in FIG. 12 and to be pulled through the slot 72 so as to be coiled on the takeup spool 38 and completely free from contact with the element 50. Immediately following this operation, it is to be understood that a complete stoppage of film advance takes place. This can be accomplished in a known manner by providing an area within the trailing portion of the film and near its end having the sprocket holes excised therefrom. The intermittent claw, accordingly, will cease to engage the film and the slip-clutch of the camera, driving the takeup spool 38 through gears 52 and 54, will slip briefly until its actuating power is turned off.

A preferred embodiment of the invention, wherein the cassette spools, in conjunction with the intermittent movement of a camera or projector, are utilized to provide all film movements, implies, as previously intimated, that a film leader is permanently attached to the takeup spool 38 and that a trailing end of the film is permanently attached to the supply spool 20, the spools being formed of a plastic, a metal, or the like and being mounted for rotation in suitable bearing means of wall 16. The film may be fastened to the spools as by short pieces of tape or integral pins.

Inasmuch as rewinding of the film is not involved in a conventional camera, it is to be regarded as taking place either in a special camera having such a facility or, for example, in a projector adapted to mount the cassette and, preferably, to cooperate in processing of the film as well as in its projection. Alternatively a special unit for rewinding and processing could be provided. If a rewind operation is performed in a camera, it would be possible to perform processing of the film therewith also by means described hereinafter.

Rewinding of the film onto spool 20 is performed by engagement of a channeled or fluted pivotal pin 74, rotatably driven by mechanism of the unit in which the cassette is mounted, with a slotted aperture 76 (FIGS. 1, 2, 3 and 5) formed in the shaft 78 of the takeup spool 38. In rewinding the film, it is to be assumed that a friction-clutch which had previously been employed to turn gear 54 and, accordingly, the spool 38 during film advancement and takeup, rotates without restriction in an opposite or rewind direction. The film would than pass, in order, around the freely rotatable rolls 48, 42 and 40 to the supply spool 20. The latter may also be assumed to be driven by a friction clutch mechanism whereby, when the end of the film which is fastened to spool 20 is reached, the spool 20 is permitted to be held briefly against further rotation and the power may then be switched off.

It will be understood that modifications of the driving linkages set forth herein between a camera or projector and the cassette are readily possible within the scope of the invention and include a reversal in position of the engaging components described as well as the use of keying means and the like. The gearing shown is primarily to provide a correct location of driving means with respect to those of a conventional camera. Where a conventional camera is not to be utilized, the gearing may be dispensed with and a direct linkage with the takeup spool provided. The walls 14 and 16 are spaced apart by an amount very slightly exceeding the width of the film and readily permit slidable movement of the film edges thereagainst. Accordingly, the walls serve as guide means to provide to provide correct film tracking, that is, proper positioning of the film on the several spools and guide rolls throughout the steps of film advance and rewind.

Elements incorporated with or positionable within the cassette chamber 26 will now be considered in detail. In FIGS. 1, 8, 14, 15 and 18, the chamber is shown as substantially open, facing the viewer. This assumes the removal of section 27, if a two-section cassette, or an open face if a single section cassette. Additionally, the wall portion 16a, bounded by partition 24 may, under certain circumstances, be deleted in part or in its entirety to provide a substantially clear opening through the cassette in a transverse direction.

In FIGS. 1 and 6, the pressure-plate 44 has been shown as permanently mounted in chamber 26, it being yieldingly suspended from wall portion 16a by a plurality of flat springs. The film margins are adapted to slidably bear against the stepped portions 44a of the pressure-plate. The raised portions 44b serve as a guide or tracking means for the film. Similarly stepped and flanged portions may, if desired, be provided on the guide rolls 40 and 42. Rectangular apertures may be formed in the pressure plate at 44c and 44d (FIG. 1) for use in processing and projection operations to be described below. An alternate mounting of the pressure plate 44 is shown in FIG. 13, in which instance a two-section cassette is assumed, The pressure plate is attached to an outer wall of the cassette section 27 and biased toward wall portion 12a by a pair of relatively long flat springs 80. When the cassette section 27 is removed as, for example, to serve a film-processing function, the pressure plate 44 is also removed from the chamber 26, thus allowing the introduction of another element, such as apertured gating means 82 (FIG. 8) of a projector (not shown) into the area which it previously occupied.

Figure 8:
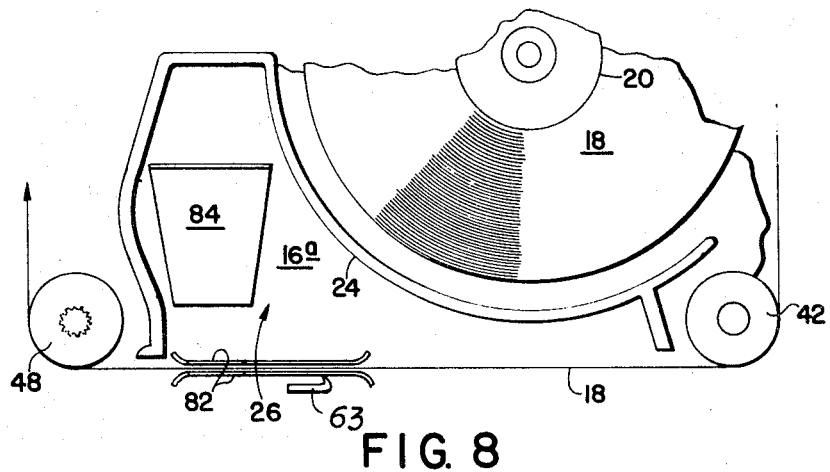
FIG. 8 is a fragmentary diagrammatic side view of a modification of the cassette structure of FIG. 1.
Figure 16:
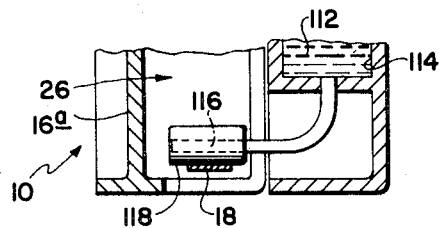
FIG. 16 is a fragmentary side view of a dispenser of a processing substance.
Figure 14:
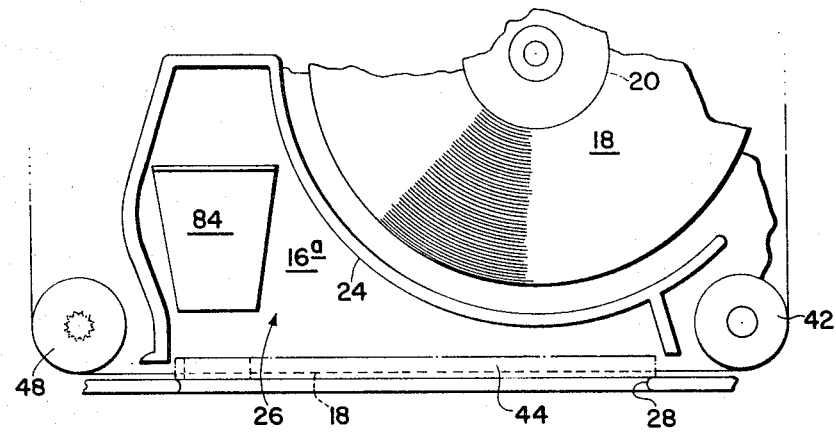
FIG. 14 is a fragmentary diagrammatic side view of a modification of the cassette structure of FIG. 1.

FIGS. 8 and 14 illustrate the incorporation of reflecting means 84 mounted at a given angle, e.g., one of 45°, within chamber 26, assuming use of the cassette in a projector having a remotely positioned light-source adapted to direct a preponderance of functional rays toward the reflecting means. The latter may be in the form of a prism or, as shown, a mirror tilted toward aperture 28, the light rays passing through each frame of the film as it is positioned adjacent thereto for projection. In contradistinction to FIG. 8, FIG. 14 shows an apertured pressure plate 44 adapted to cooperate with reflecting means 84 instead of the gating components 82 of FIG. 8.

Figure 15:
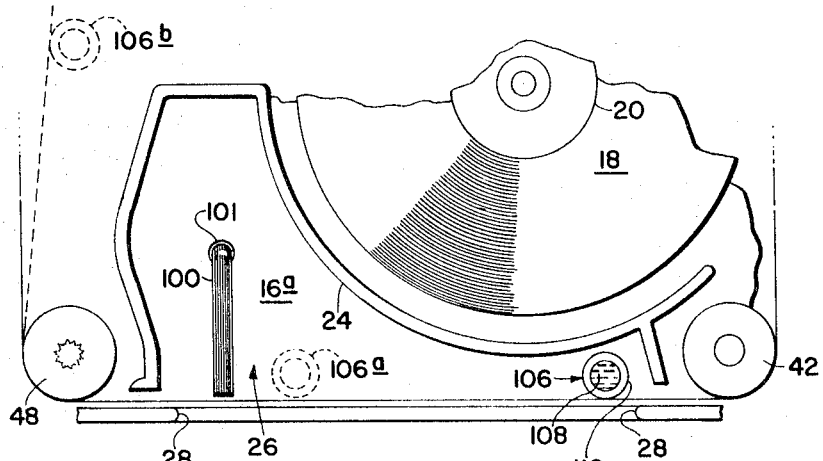
FIG. 15 is a fragmentary diagrammatic side view of a further modification of the cassette structure of FIG. 1.
Figure 18:
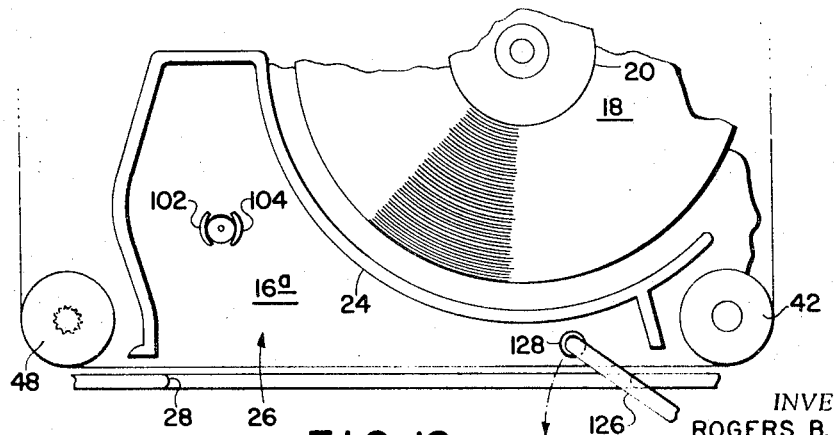
FIG. 18 is a fragmentary diagrammatic side view of a further modification of the cassette structure of FIG. 1.

Alternate means for providing illumination of the film 18 for projection purposes are illustrated in FIGS. 15 and 18. In FIG. 15 a functionally curved fiber-optics bundle of filaments 100 is shown as extending from a light source, no shown, but which is to be understood as positioned at a shielded location, e.g., at the remote side of wall 16a. The element 100 may be considered as an integral component of the cassette or, preferably, it may be an element of the projector and introduced into chamber 26 through an open face or an aperture 101 when the cassette is mounted therein. A condenser lens, not shown, may alternatively, be employed in conjunction with the element 100. In FIG. 18, a light source 102 of type adapted to adequately illuminate film 18, such as one comprising a filament and a reflector or condenser enclosed in an envelope, is provided. This light source may be an integral component of the chamber 26 or it may be an element of the projector and introduced therein to a location established by the cliplike engaging means 104 for correct positioning purposes when the cassette is mounted in the projector, the latter being a preferred embodiment.

Processing means of several types for developing the film 18 after its exposure are represented in FIGS. 15—18. In this regard, it is to be understood that a processing substance may be in the form of a liquid of various viscosity or it may be otherwise classified, the cassette and cooperating means of the present invention not being limited to use with a particular type thereof. Similarly, a motion-picture film material adapted to use in the cassette may be of either a black-and-white or color category and may vary somewhat as to structure and processing characteristics within these classifications. As previously intimated, a film material relating to that shown in the present instance is described in U.S. Pat. No. 3,087,815. Film materials and processing methods and substances of a related nature are also set forth in the copending U.S. Pat. applications Ser, No. 738,464, entitled Motion-Picture System, filed by E. H. Land on June 20, 1968; Ser. No. 761,771, entitled Motion Picture Processing and Projection System Employing Multipurpose Cassette, filed by R. B. Downey on Sept. 23, 1968; Ser. No. 755,901, entitled Motion Picture System with Compact Multipurpose Cassette, filed by E. H. Land on Aug. 28, 1968; and Ser. No. 776,481, entitled Motion Picture Processing and Projecting System Employing Multipurpose Cassette and Strip Tape, filed by R. B. Downey on Nov. 18, 1968.

In FIG. 15, a processing means in the form of an applicator or dispenser 106, of a processing substance, variously positioned at 106a and 106b is illustrated. If the substance is to be applied to the film emulsion during advance of the film from supply spool 20 to the takeup spool, the applicator at 106 or 106a would permit a considerable travel of the film for drying or other purposes if such were required. If the processing substance were to be dispensed during a rewind operation an application thereof at 106b would permit a similar advantage. The applicator 106 may, for example, comprise a central reservoir 108 of a dispensable, e.g., a flowable, substance surrounded by a porous pad 110 through which the liquid is permeated. It may be in the form of a collapsible or frangible container of a liquid or a viscous or gel-like substance subject to actuation by cooperating structure of the unit in which the cassette is mounted to bring the applicator into contact with the film surface and effect release or ejection of its content. On the other hand, the processing means may be of a form suggested in FIG. 16, wherein a supply of a processing liquid 112 is provided in a container component 114 of the cassette which may be of either the one- or two-section type previously described. The liquid, upon opening a valve or other release means (not shown) of the aforesaid cooperating structure, is led to the core 116, through perforation thereof to the pad, and thence to the emulsion of film 18.

Figures 9, 17:
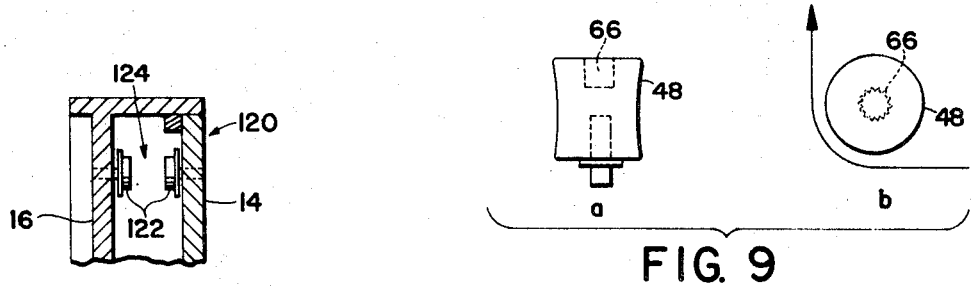
FIG. 9 is a diagrammatic view of a snubbing element of the cassette illustrating its operation.
FIG. 17 is a fragmentary view of a device for bringing a length of motion picture film into contact with a processing substance.

FIG. 17 illustrates a device 120 for automatically bringing the film into contact with a processing substance as, for example, with the applicator 106b of FIG. 15. The device 120 is somewhat similar in structure and, in part, functionally, to that of FIGS. 11 and 12 expecting that a pair of rotatable guide rollers 122 supplants the fixed snubbing elements 50a and 50b. When the excised portion 18b of film reaches the rollers 122, the film falls or is drawn through the space 124 provided therebetween and comes into contact with the processing substance.

In FIG. 18, an alternative means for subjecting the film 18 to a processing substance is indicated. A lever 126 having a roller 128 at its extremity is mounted for pivotal movement in the unit carrying the cassette. At a predetermined stage of operation, e.g., at one close to the commencement of film advance or rewind, driving means of the aforesaid unit (not shown) provides a functional cycle of pivotal movement of lever 126 to direct a loop of the moving film (FIG. 3) into contact with a processing substance positioned for interception of the loop.

Wherein the cassette of the present invention has been described with reference to its possible use with photographic equipment of a conventional category, in addition to that particularly adapted to cooperation with its structural components, it is not to be constructed as a positive assertion that the cassette can be thus employed with conventional equipment. Accordingly, its use may necessarily be restricted to employment in camera and projection equipment especially adapted thereto.

By the term "effective light source," as used herein, is intended either a light source, per se, or an image of a light source serving a similar function. In the latter instance, the "effective light source" may be a reflected image of a light source, rays from which fall upon a reflecting surface.

Since certain changes may be made in the above product and apparatus without departing from the scope of the invention herein involved, it is intended that all matter contained in the above description or shown in the accompanying drawings shall be interpreted as illustrative and not in a limiting sense.

What I claim is:

1. A cassette for use in a motion-picture system wherein a motion-picture film is photographically exposed, processed, and ready for immediate projection following its processing, said cassette being adapted to mounting in and removal from complementary mounting means of a camera or projector unit of said system and comprising a rectangular housing including a plurality of end and sidewall portions and an internal light-shielding partition forming a chamber therewithin, means forming a first aperture in a sidewall potion leading into said chamber for enabling access to said chamber and the provision of an effective light source at a given location therewithin, means forming a second aperture in an end wall portion leading into said chamber adapted to the passage of said film thereacross and a transmission of light from said effective light source therethrough, a film takeup spool mounted for rotation on a given sidewall portion having coupling means for engaging drive means of that unit in which the cassette is mounted to provide, in conjunction with an intermittent mechanism of said unit, an advance movement of said film, a film-supply spool mounted for substantially free rotation on said given sidewall portion and having coupling means for engaging driving means of said unit to provide its rotation in a direction for rewind movement of said film, guide means for determining the path of movement of said film between said spools and across said aperture which is located intermediate of said spools, a pressure plate mounted on a given portion of said cassette so as to extend substantially across said second aperture including biasing means therefor for establishing a correct position of said film during its passage across said second aperture, and snubbing means providing, in conjunction with said film-supply and film takeup spools together with said intermittent mechanism and drive means of said unit, a controlled intermittent movement of said film across said second aperture of said chamber, said snubbing means including a roller mounted for rotation and adapted to be held fixed against rotation during advancement of said film by complementary engaging means of said unit in which said cassette is mounted.

2. A cassette, as defined in claim 1, wherein said supply spool contains a given length of photosensitive motion-picture film having a leader passing around said guide and snubbing means attached to said takeup spool and a trailing end attached to said supply spool.

3. A cassette for use in a motion-picture system wherein a motion-picture film is photographically exposed, processed, and ready for immediate projection following its processing, said cassette being adapted to mounting in and removal from complementary mounting means of a camera or projector unit of said system and comprising a rectangular housing including a plurality of end and sidewall portions and an internal light-shielding partition forming a chamber therewithin, means forming a first aperture in a sidewall portion leading into said chamber for enabling access to said chamber and the provision of an effective light source at a given location therewithin means providing said effective light source at said location, means forming a second aperture in an end wall portion leading into said chamber adapted to the passage of said film thereacross and a transmission of light from said effective light source therethrough, a film takeup spool mounted for rotation on a given sidewall portion having coupling means for engaging drive means of that unit in which the cassette is mounted to provide, in conjunction with an intermittent mechanism of said unit, an advance movement of said film, a film-supply spool mounted for substantially free rotation on said given sidewall portion and having coupling means for engaging driving means of said unit to provide its rotation in a direction for rewind movement of said film, guide means for determining the path of movement of said film between said spools and across said second aperture which is located intermediate of said spools, pressure plate means mounted to extend substantially across said second aperture including biasing means therefor for establishing a correct position of said film during its passage across said aperture, and snubbing means providing, in conjunction with said film-supply and film takeup spools together with said intermittent mechanism and drive means of said unit, a controlled movement of said film across said second aperture of said chamber, said chamber including means mounted therewithin adapted to apply a processing substance to said film.

4. A cassette for use in a motion-picture system wherein a motion-picture film is photographically exposed, processed, and ready for immediate projection following its processing said cassette being adapted to mounting in and removal from complementary mounting means of a camera or projector unit of said system and comprising a rectangular housing including a plurality of end and sidewall portions and an internal light-shielding partition forming a chamber therewithin, means forming a first aperture in a sidewall portion leading into said chamber for enabling access to said chamber and the provision of an effective light source at a given location therewithin, means providing said effective light source at said location, means forming a second aperture in an end wall portion leading into said chamber adapted to the passage of said film thereacross and a transmission of light from said effective light source therethrough, a film takeup spool mounted for rotation on a given sidewall portion having coupling means for engaging drive means of that unit in which the cassette is mounted to provide, in conjunction with an intermittent mechanism of said unit, an advance movement of said film, a film-supply spool mounted for substantially free rotation on said given sidewall portion and having coupling means for engaging drive means of said unit to provide its rotation in a direction for rewind movement of said film, guide means for determining the path of movement of said film between said spools and across said second aperture which is located intermediate of said spools, pressure plate means mounted to extend substantially across said second aperture including biasing means therefor for establishing a correct position of said film during its passage across said second aperture, snubbing means providing in conjunction with said film-supply and film takeup spools together with said intermittent mechanism and drives means of said unit, a controlled movement of said film across said second aperture of said chamber, and means for automatically altering a path of movement of said film, in cooperation with an excised portion of the latter, to bring the film into contact with a processing substance.

5. A motion-picture film handling cassette comprising:
an enclosed opaque housing;
an unexposed strip of photographic material coiled with said housing;
a film gate for access of light rays to selected incremental portions of said strip of material;
a normally inoperative film processing element;
means for guiding said strip of material along a given path within said housing across said film gate and transverse said processing element, said guiding means including at least one roller mounted for free rotation in both directions about its axis;
means for advancing said strip of material along said path and for returning said strip of material along said path to its original coiled position; and
means for selectively restraining means being engaged by an externally mounted member.

6. The cassette of claim 5 wherein said advancing and returning means comprises a supply spool to which one end of said strip of material is connected and around which said strip of material is initially substantially entirely coiled and a takeup spool to which the other end of said strip of material is connected and wherein said roller is positioned intermediate said film gate and said takeup spool.

7. The cassette of claim 6 wherein said spools are coplanarly mounted within said housing.

8. The cassette of claim 5 wherein said restraining means comprises a portion of said roller having a recess provided therein adapted to receive a pin, said recess and said pin being of complementary configurations so that rotational movement of said roller is restrained when said pin is seated in said recess.

9. The cassette of claim 5 wherein said restraining means comprises a portion of said roller having a recess provided therein a pin mounted on said cassette in registry with said recess for slidable movement into and out of said recess, said recess and said pin being of complementary configurations so that rotational movement of said roller is restrained when said pin is seated in said recess.

10. A motion-picture film handling cassette comprising:
an enclosed, opaque housing including a pair of juxtaposed space apart sidewalls;
an unexposed strip of photographic material coiled within said housing, said strip of material having a first predetermined width less than said predetermined spacing between said sidewalls and a narrowed portion of a second predetermined width at a selected position therealong;
a film gate for access of light rays to selected incremental portions of said strip of material;
a normally inoperative film processing element;
means for guiding said strip of material along a given path within said housing across said film gate and transverse said processing element, said guiding means including a pair of fixedly positioned film-contacting segments respectively extending in registry from the inside faces of said sidewalls and spaced apart a distance greater than said second predetermined width and less than said first predetermined width; and
means for advancing said strip of material along said path, whereby said film-contacting segments impart a snubbing effect to said strip of material during such advancement, to a point where said narrowed portion of said strip of material is aligned with said film-contacting segments and said strip of material becomes automatically disengaged from said film-contacting segments, and for returning said strip of material along a path at least in part displaced from said first-mentioned path.

UNITED STATES PATENT OFFICE
CERTIFICATE OF CORRECTION

Patent No. 3,584,942                    Dated  June 15, 1971

Inventor(s)    Rogers B. Downey

It is certified that error appears in the above-identified patent and that said Letters Patent are hereby corrected as shown below:

Column 1, line 7, after "of" insert -- a --; line 16, after "cassette" insert -- and to cooperation with components of the cassette --. Column 2, line 12, after "projector" insert -- to --. Column 3, line 8, "chamber", first occurrence, should read -- chambers --. Column 4, line 32, "shown," should read -- shown. --; line 62, after "and" insert -- the --. Column 5, line 21, "therewith" should read -- therewithin --. Column 6, line 24, "no" should read -- not --; line 32, after "of" insert -- a --. Column 7, line 12, after "opening" insert -- of --; line 21, "expecting" should read -- excepting --; line 41, "constructed" should read -- construed --. Column 8, line 7, after "said" insert -- second --; line 25, after "means" insert -- and --; line 57, after "said" insert -- second --. Column 9, line 28, "with" should read -- within --; line 41, after "restraining" insert -- rotation of said roller during film advance responsive to said rotation restraining --. Column 10, line 13, after "therein" insert -- and --; line 20, "space" should read -- spaced --.

Signed and sealed this 23rd day of May 1972.

(SEAL)
Attest:

EDWARD M. FLETCHER, JR.                 ROBERT GOTTSCHALK
Attesting Officer                       Commissioner of Patents